United States Patent
Ueno et al.

(10) Patent No.: US 6,175,206 B1
(45) Date of Patent: Jan. 16, 2001

(54) ROBOT INFORMATION PROCESSOR

(75) Inventors: Takahiro Ueno; Takashi Takatori, both of Akashi (JP)

(73) Assignee: Kawasaki Jukogyo Kabushiki Kaisha, Hyogo-ken (JP)

( * ) Notice: Under 35 U.S.C. 154(b), the term of this patent shall be extended for 0 days.

(21) Appl. No.: 09/423,557

(22) PCT Filed: May 12, 1998

(86) PCT No.: PCT/JP98/02090

§ 371 Date: Nov. 10, 1999

§ 102(e) Date: Nov. 10, 1999

(87) PCT Pub. No.: WO98/52109

PCT Pub. Date: Nov. 19, 1998

(30) Foreign Application Priority Data

May 12, 1997 (JP) .................................... 9-121345

(51) Int. Cl.⁷ ...................................... B25J 9/16
(52) U.S. Cl. .................. 318/568.1; 701/264; 701/265
(58) Field of Search .................. 700/264, 255; 318/568.1

(56) References Cited

U.S. PATENT DOCUMENTS 5,946,425 * 8/1999 Bove, Jr. et al. .................... 382/294
5,999,940 * 12/1999 Ranger ................................ 707/103

FOREIGN PATENT DOCUMENTS

| 6-95729   | 4/1994  | (JP) . |
| 7-64618   | 3/1995  | (JP) . |
| 7-306710  | 11/1995 | (JP) . |
| 8-263125  | 10/1996 | (JP) . |
| 9-34531   | 2/1997  | (JP) . |
| 9-62338   | 3/1997  | (JP) . |
| 9-91017   | 4/1997  | (JP) . |
| 10-31513  | 2/1998  | (JP) . |

OTHER PUBLICATIONS

Taketoshi Mori, et al., "A Teleoperation System Using Java Object", The Research Center for Advanced Technology, the University of Tokyo & Graduate School of Engineering, the University of Tokyo (w/abstract).

Hiroyuki Nishiyama, et al., "Design of Imaginary Experiment Environment for Multi Robot using Java", Faculty of Science and Technology, Science University of Tokyo (w/abstract).

Fumio Mizoguchi, et al., "Design of an Educational Support System for Robot Programming Using Java", Faculty of Science and Technology, Science University of Tokyo (w/abstract).

Hiroyuki Nishiyama, et al., "Design of Remote Control System/Experiment Environment for Multi–Robot", Faculty of Science and Technology, Science University of Tokyo (w/abstract).

* cited by examiner

Primary Examiner—Karen Masih
(74) Attorney, Agent, or Firm—Oliff & Berridge PLC

(57) ABSTRACT

There are provided a server processing unit 100 which includes a robot control unit 104 for operating a robot body 106 at real time and which provides a network connection function, and a client processing unit 200 connected to the server processing unit 100 via a network 300. A general-purpose public program 501 operating on the client processing unit 200 uses a robot control program unit 403 and a robot monitor program unit 403 which are transmitted from the server processing unit 100. According to the present invention, it is possible to reduce the amount of information transmitted via a communication line, and it is possible to develop an application program of a user's individual specification and an application capable of operating on a network.

9 Claims, 10 Drawing Sheets

| PROGRAM NAME | CREATION DATE | TIME | CONTENTS OF PROGRAM |
|---|---|---|---|
| PROGRAM A1 | 97. 5. 1 | 15:00 | |
| PROGRAM B1 | 97. 4. 26 | 17:00 | |
| PROGRAM C1 | 97. 3. 27 | 10:00 | |
FIG.8
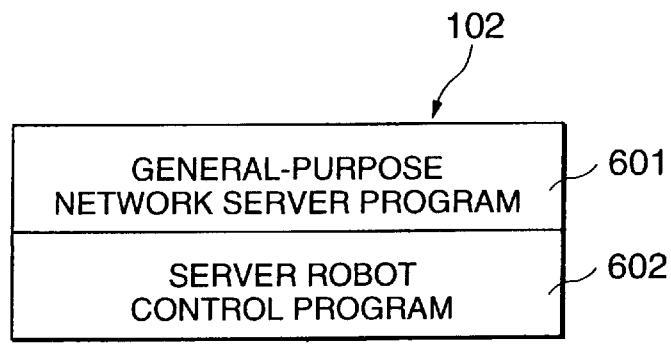
FIG.9
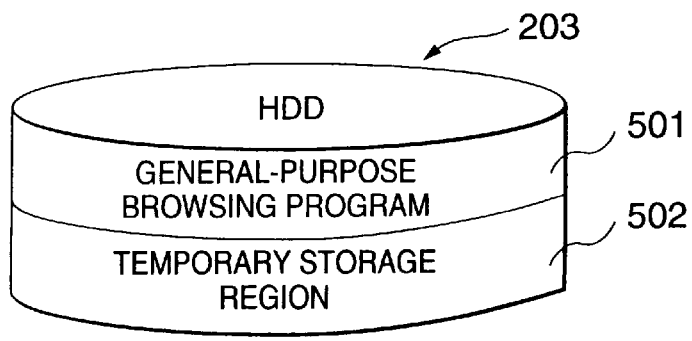
FIG.10

ROBOT INFORMATION PROCESSOR

TECHNICAL FIELD

The present invention relates generally to a robot information processing apparatus which can be favorably utilized to observe the operating state of a robot body at a remote place and to remotely operate the robot body.

BACKGROUND ART

Conventionally, a robot controller is provided as a system integrated with a robot body. Therefore, even if a network corresponding function is intended to be added, a dedicated network system must be constructed, so that the development thereof requires a vast amount of man-hours and takes a long period of time. In addition, it is next to impossible for the user to change a robot control software on the basis of an individual specification.

As the typical prior art, there is Japanese Patent Laid-Open No. 7-64618, which discloses a construction for displaying the operating state of a robot body via a network. However, in this prior art, there is no device for decreasing the amount of transmission information of the network serving as a communication line and for managing an application program.

A typical robot control software is supplied as a dedicated system integrated with a robot controller, and does not operate on any general-purpose personal computers and/or any general-purpose operating system (OS). For that reason, there are the following problems (1) and (2). That is, (1) since the software is supplied as the integrated dedicated system, it is impossible for the user to develop the software on the basis of the individual specification. In addition, (2) since the dedicated system is used, when the software operating on the network is developed, the network system itself must be newly developed, so that it is very difficult to develop the software.

SUMMARY OF THE INVENTION

It is therefore an object of the present invention to realize a software supply form, in which the user is free to construct an application program, to provide a robot information processing apparatus capable of developing a network corresponding application program using the same.

According to a first aspect of the present invention, a robot information processing apparatus comprises: a server processing unit; and a client processing unit connected to the server processing unit via a communication line. The server processing unit includes detecting means for detecting the positions of a plurality of axes of a robot body, which serves as an object to be driven, and for outputting detection data, and first communication means for transmitting the detection data outputted from the detecting means. On the other hand, the client processing unit includes display means for carrying out a visual display, second communication means for communicating with the first communication means via the communication line, and processing means for displaying the detection data, which are received by the second communication means, on the display means.

In recent years, in the FA (Factory Automation) industry, a man machine interface is constructed as an application program operating on a general-purpose OS, such as Windows (trade name), and an application program capable of being easily utilized by end users is constructed by a graphical user interface. In addition, application development tools on the general-purpose OS are enriched year by year, and the standard of software components available to the application development tools are in the process of being defined. Moreover, as network techniques are rapidly developed in recent years, the software operating on a network can be easily developed.

The present invention is favorably utilized particularly in the above described circumstances. According to the present invention, a real time processing part for controlling a robot is separated from a network part for providing a network connection function, the network part utilizing a general-purpose computer wherein a general-purpose OS, such as Windows, operates, and the network part being connected to the real time processing part via a standard bus. Thus, general-purpose network apparatus and materials can be utilized for the network part, and general-purpose development tools can be utilized to develop programs.

For example, the present invention is applied to a robot control unit comprising: a server processing unit which includes control means for carrying out a real time processing for operating a robot body and which is a general-purpose computer for providing a network connection function; and a client processing unit which is a general-purpose computer connected to the server processing unit via a network serving as a communication line.

Specifically, the present invention comprises a server robot control program operating on the server processing unit, and a client robot control program unit and a robot monitor program unit which operate on a general-purpose browsing program operating on the client processing unit.

According to the first aspect of the present invention, detection data detected by the detecting means of the server processing unit are transmitted to the communication line, and visually displayed on the display means in the client processing unit. Therefore, as described above, only the detection data are transmitted to the communication line, and the pixel information on the whole screen to be displayed on the display means are not always transmitted, so that it is possible to reduce the amount of transmitted information.

According to a second aspect of the present invention, a robot information processing apparatus comprises: a server processing unit; and a client processing unit connected to the server processing unit via a communication line. The server processing unit includes detecting means for detecting the positions of a plurality of axes of a robot body, which serves as an object to be driven, and for outputting detection data, server storage means for storing a monitor program for displaying the detection data, and first communication means for transmitting the detection data, which are outputted from the detecting means, and the monitor program stored in the server storage means. On the other hand, the client processing unit includes display means for carrying out a visual display, second communication means for communicating with the first communication means via the communication line, and processing means for executing the monitor program, which is received by the second communication means, to display the detection data on the display means.

According to the second aspect of the present invention, the monitor program stored in the server storage means is transmitted to the client processing unit via the communication line, and the monitor program is executed by the processing means in the client processing unit to visually display the detection data on the display means. Thus, it is possible to reduce the amount of information transmitted through the communication line, and it is possible to carry out the unified management of the monitor program on the server processing unit side. In particular, when there are a plurality of client processing units, it is possible to easily change the application program.

According to a third aspect of the present invention, a robot information processing apparatus comprises: a server processing unit; and a client processing unit connected to the server processing unit via a communication line. The server processing unit includes control means for driving and controlling a robot body having a plurality of axes, which is an object to be driven, in response to command data at real time, server storage means for storing a robot control program for operating the robot body, and first communication means for transmitting the robot control program, which is stored in the server storage means, and for providing command data to the control means. On the other hand, the client processing unit includes second communication means for communicating with the first communication means via the communication line, input means for inputting command data, and processing means for executing the robot control program, which is received by the second communication means, to transmit command data, which are inputted by the input means, to the first communication means by the second communication means.

According to the third aspect of the present invention, the robot control program stored in the server storage means is transmitted to the client processing unit via the communication line to be processed by the processing means in the client processing unit. Thus, the command data inputted by the input means are processed by the robot control program to be transmitted to the server processing unit via the second communication means, the communication line and the first communication means. Thus, it is possible to carry out the unified management of the robot control program on the server processing unit side.

According to a fourth aspect of the present invention, in the above described second or third aspect, the server processing unit further comprises: program updating means for updating the program stored in the server storage means; and updated time data generating means for generating updated time data indicative of the updated time of the program updated by the program updating means and for storing the updated time data, together with the updated program, in the server storage means. The client processing unit further comprising client storage means for storing a program and updated time data. The processing means of the client processing unit reads out updated time data, which correspond to a program to be executed, from the server storage means via the second communication means, and reads out updated time data stored in the client storage means. Then, the processing means of the client processing unit reads out the program, which is stored in the server storage means, of the server storage means via the second communication means, when the updated time data stored in the client storage means are older than the updated time data from the server storage means.

According to a fifth aspect of the present invention, in the above described second or third aspect, the server storage means may store an interrelation describing file for defining the interrelation between program units, which are executed by the server processing unit and client processing unit, so as to be able to modify the interrelation describing file. The server processing unit and the client processing unit may select and execute a program unit designated by the interrelation describing file.

According to a sixth aspect of the present invention, in the above described fifth aspect, the program unit executed in the client processing unit may operate on a general-purpose browsing program.

According to the fifth and sixth aspects, when the interrelation between the program units is defined by the interrelation describing file, and when the general-purpose browsing program is executed in the client processing unit to access the server processing unit, the interrelation describing file is automatically read to the client storage means to analyze the necessary program units to compare the old and new of the program unit existing on the temporary storage region in the client processing unit with those of the program unit existing in the server processing unit. If the program unit on the temporary storage means is older, the server processing unit is automatically required to execute the program.

Furthermore, by modifying the interrelation describing file, it is possible to provide a desired robot control program.

In addition, the programs operating on the client processing unit are provided as program units operating on a general-purpose browsing program, and these program units are designated by the interrelation describing file to realize the robot control program and monitor program. Therefore, the user can control the robot body by the general-purpose browsing program on the general-purpose computer, and change the program on the basis of the individual specification by changing the interrelation describing file, the standard of which has been announced.

BRIEF DESCRIPTION OF THE DRAWINGS

FIG. 8 is a schematic diagram showing the contents stored in the storage unit provided in the server processing unit, and the contents stored in a storage unit provided in the client processing unit;

FIG. 9 is a schematic diagram showing the contents stored in a memory of the server processing unit during execution;

FIG. 10 is a schematic diagram showing the contents stored in the storage unit provided in the client processing unit;

BEST MODE FOR CARRYING OUT THE INVENTION

Referring now to the accompanying drawings, the preferred embodiments of the present invention will be described below.

Figure 1:
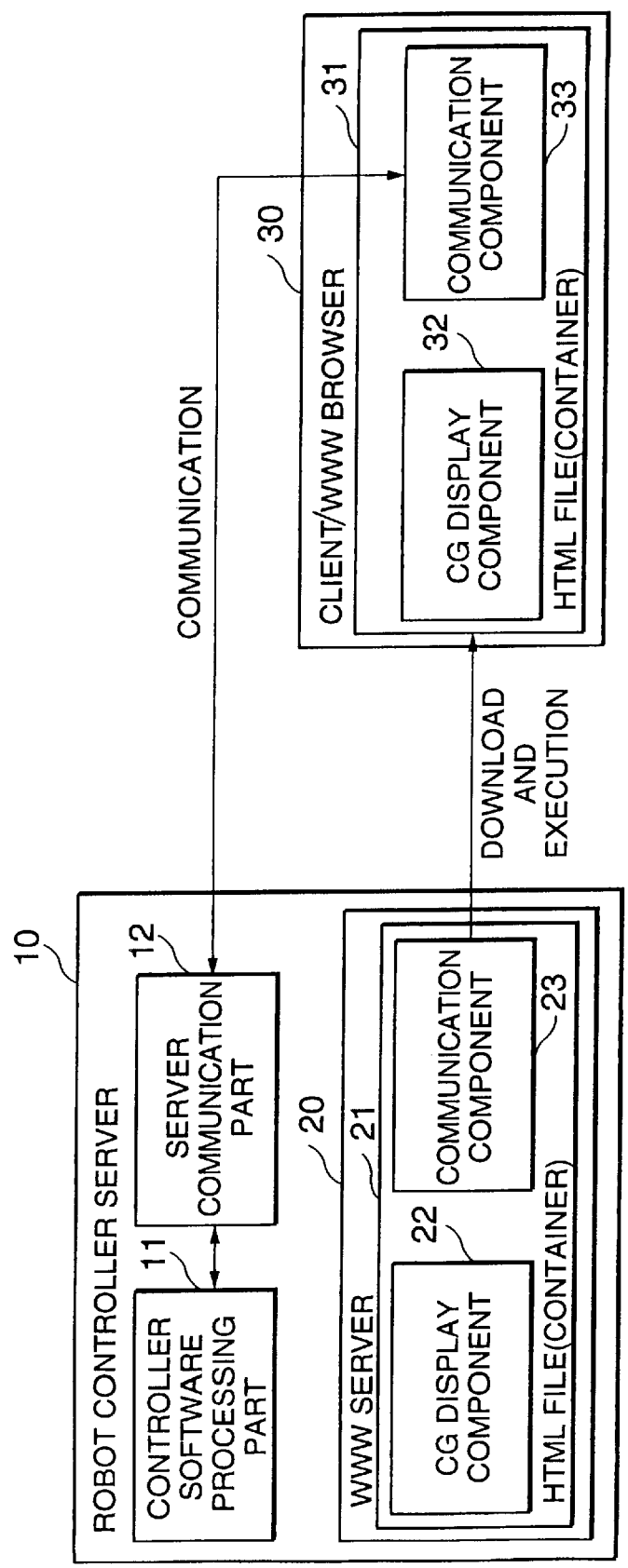
FIG. 1 is a block diagram schematically showing a robot information processing apparatus according to the present invention.

FIG. 1 is a block diagram schematically showing a robot information processing apparatus according to the present invention. Herein, an application program operating on a robot information processing apparatus is realized using a network corresponding software component (a program unit). That is, in this preferred embodiment, a man machine interface of a robot controller is realized using a component group prepared on the basis of a network corresponding software component standard, and operated on a WWW (World Wide Web) browser (a general-purpose browsing program). Software components are available on a platform called container. By optionally combining the software components on the container, an application program can be easily prepared. Furthermore, as a software which may serve as the container, there is an HTML (Hyper Text Markup Language) file available on a WWW or the like.

In FIG. 1, a client processing unit (client WWW browser) 30 accesses a WWW server processing unit 20 in a server processing unit 10 serving as a robot controller to automatically download and temporarily store an HTLM file 21 serving as a container and software components 22, 23 to execute them as an HTLM file (container) 31, a CG (Computer Graphics) display component 32 and a communication component 33. The communication component 33 on the HTLM file 31 communicates with a server communication part 12 of the server processing unit 10. The server communication part 12 communicates with a processing part 11, which is provided for executing a robot controller software, on the basis of an indication from the client processing unit 30 to control a robot body and to acquire internal data and an operation program.

Since such a robot information processing apparatus downloads and executes a software every time the client processing unit 30 accesses the server processing unit 10, the unified management of the software can be carried out on the side of the server processing unit 10, so that there is an advantage in that it is not required to carry out the version up of the software by the client processing unit 30.

In addition, since the robot controller software is provided as functionally divided network corresponding software components, the user is free to combine these components to easily prepare an application program of an individual specification and an application program operating on the network.

Figure 2:
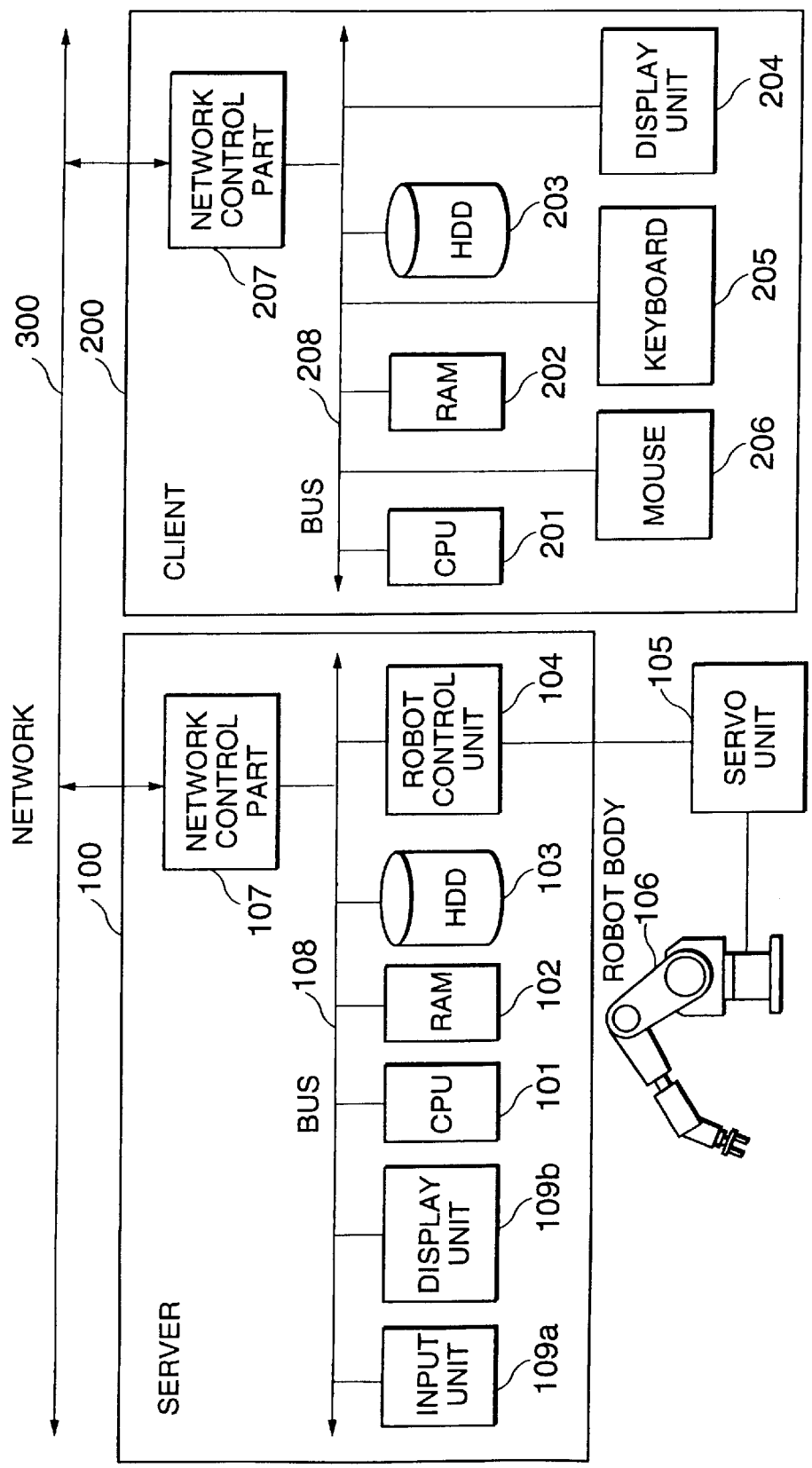
FIG. 2 is a block diagram showing the whole construction of a preferred embodiment of a robot information processing apparatus according to the present invention.

FIG. 2 is a block diagram showing the whole construction of a preferred embodiment of a robot information processing apparatus according to the present invention. A server processing unit 100 and a client processing unit 200 are connected to each other via a network 300 serving as a communication line. The network 300 may be Ethernet or a public telephone line. A robot control unit 104 of the server processing unit 100 is connected to a robot body 106 via a servo unit 105. The robot body 106 has a plurality of (e.g., 6) axes for driving wrists and so forth. The servo unit 105 is designed to drive the respective axes of the robot body 106. The robot control unit 104 is designed to provide command data to the servo unit 105. Furthermore, the robot control unit 104 and the servo unit 105 are associated with each other to constitute a control means for driving and controlling the robot body 106 at real time. A network control part 107 serving as a first communication means is connected, by means of a bus 108, to a processing circuit (CPU) 101, storage or memory means, such as a random access memory (RAM) 102 and a hard disc drive memory unit (HDD), and the robot control unit 104. The network control part 107 is also connected to an input unit 109a for inputting command data and programs by operating a keyboard or mouse, and to a display unit 109b realized by a liquid crystal or cathode ray tube.

In the client processing unit 200, a network control part 207 serving as a second communication part is connected to the network 300. The network control part 207 is connected, by means of a bus 208, to a processing circuit (CPU, processing means) 201 and storage or memory means, such as a random access memory (RAM) 202 and a hard disc drive memory unit (HDD) 203. The network control part 207 is also connected to an input unit (input means) including a keyboard 205 and a mouse 206, and to a display unit (display means) 204 realized by a liquid crystal or cathode ray tube for visual display.

Figure 3:
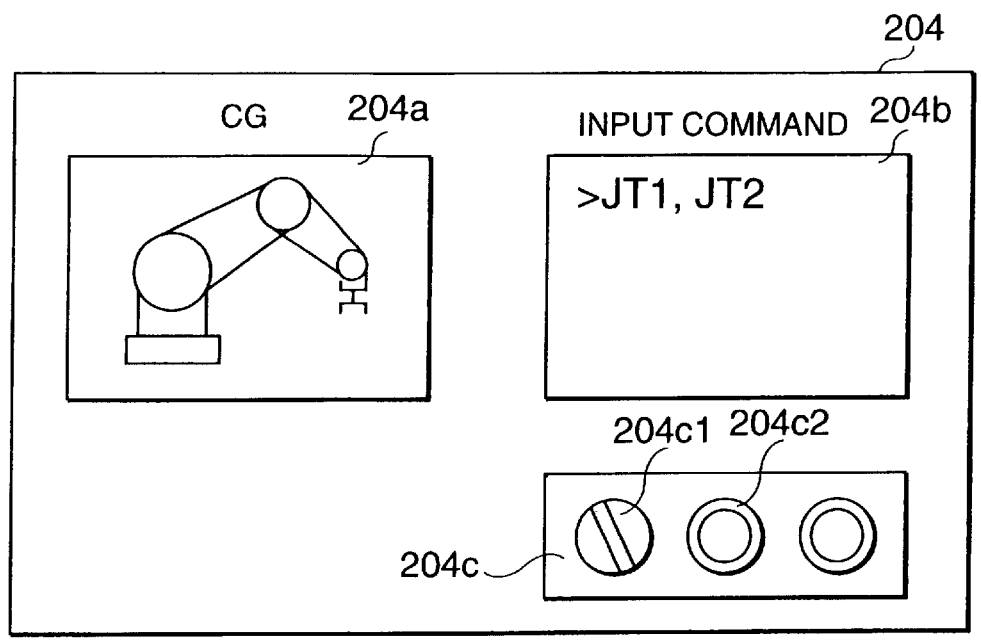
FIG. 3 is a schematic diagram showing a display screen of a display unit of a client processing unit shown in FIG. 2.

FIG. 3 is a schematic diagram showing the display screen of the display unit 204. The operating state of the robot body 106 is displayed on a window region 204a of the display screen as a perspective view or a simplified view. In addition, command data and so forth serving as input commands inputted by the keyboard 205 and/or the mouse 206 are displayed on a window region 204b. Moreover, a switch 204c1, a push-button switch 204c2 and so forth displayed on an input display region 204c are designed to be clicked by the mouse 206.

Figure 4:
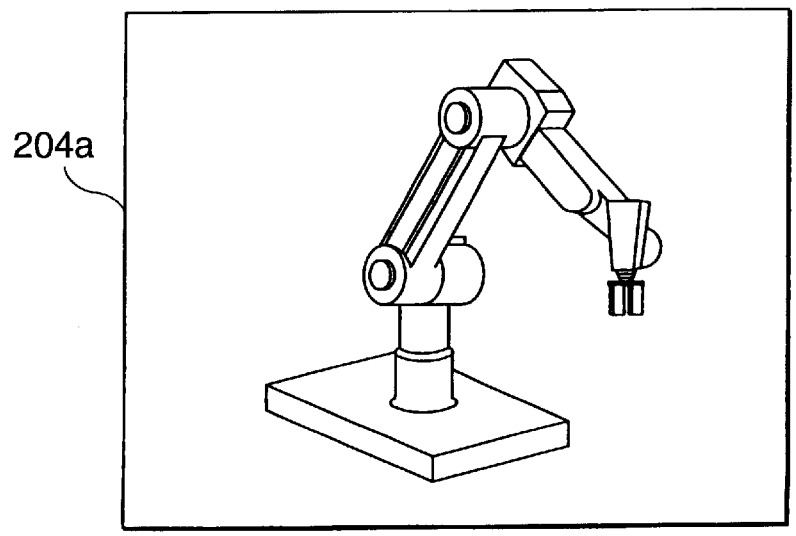
FIG. 4 is a schematic diagram showing a window region on the screen of the display unit, on which the operating state of a robot body is shown.

FIG. 4 is a schematic diagram showing the window region 204a on the screen of the display unit 204a, on which the operating state of the robot body 106 is shown. By operating the keyboard 205 and/or the mouse 206, the viewed direction of the robot body 106 displayed on the window region 204a can be changed.

Figure 5:
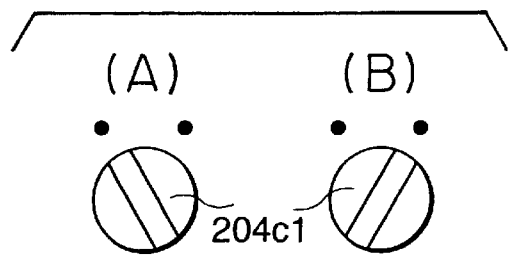
FIG. 5 is a schematic diagram for explaining a switch in an input display region on the screen of the display unit.

Moreover, FIG. 5 is a schematic diagram for explaining the switch 204c1 in the input display region 204c. The image of the switch 204c1 in the state shown in FIG. 5(A) can be changed to the switching state shown in FIG. 5(B) by moving and clicking a cursor by means of the mouse 206. In addition, by repeating this operation, the operating states shown in FIGS. 5(A) and 5(B) can be switched.

Figure 6:
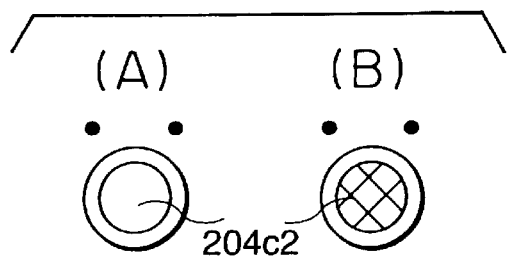
FIG. 6 is a schematic diagram for explaining a push-button switch for inputting command data and other information of the robot body.

Moreover, the state of the push-button switch 204c2 can be changed from the state shown in FIG. 6(A) to the state shown in FIG. 6(2) by moving and clicking the cursor by means of the mouse 206. In addition, by repeating this operation, the operating states shown in FIGS. 6(A) and 6(B) can be alternately repeated. Thus, to the client processing unit 200, command data for the robot body 106 and other information can be inputted by means of the keyboard 205 and/or the mouse 206.

Figure 7:
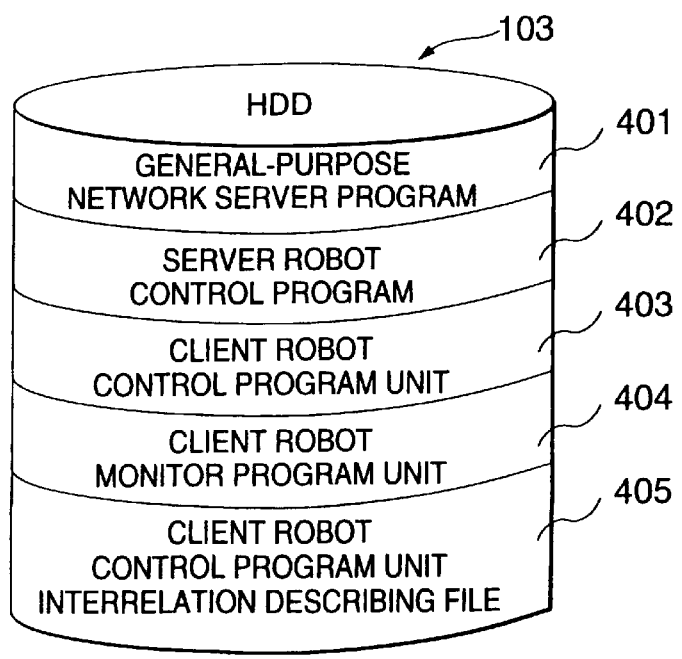
FIG. 7 is a schematic diagram showing the contents stored in a storage unit provided in a server processing unit.
Figure 11:
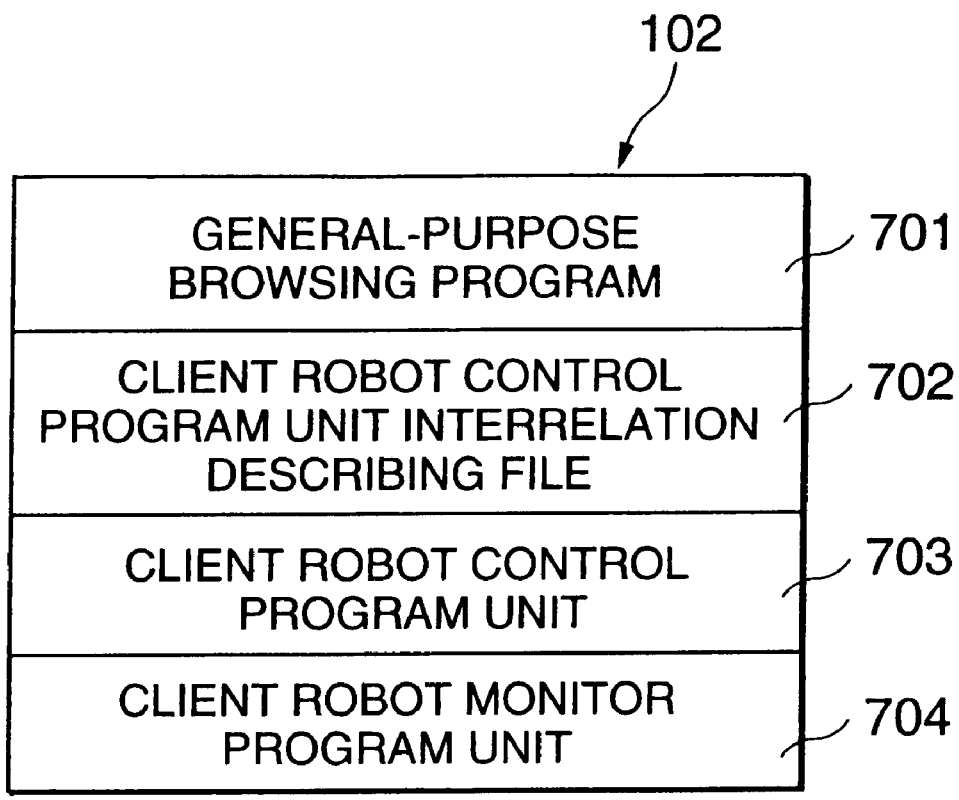
FIG. 11 is a schematic diagram showing the contents stored in a memory of the client processing unit during execution.

FIG. 7 is a schematic diagram showing the contents stored in the storage unit provided in the server processing unit 100. In this storage unit 103, there are stored a general-purpose network server program 401, a server robot control program 402, a client robot control program 403, a client robot monitor program unit 404 and a client robot control program unit interrelation describing file 405, which are able to be changed or modified by the input unit 109a using the processing unit 101 serving as program updating means. Among these programs 401 to 405, the programs 401 and 402 are read out of the storage unit 103 and written on the memory 102 as shown in FIG. 9 which will be described later. The residual programs 403 through 405 are transmitted to the memory 202 in the client processing unit 200 during execution and stored as programs 702 through 704 as shown in FIG. 11 which will be described later. Furthermore, programs 601 and 602 in FIG. 9 correspond to the programs 401 and 402 in the memory unit 103, respectively.

With respect to the programs inputted and changed by the input unit 109a of the server processing unit 100, the processing circuit 101 serves as an updated timing data generating means to store program names A1, B1, C1, ... , updated time data indicative of program created or updated time clocked by a timing device (not shown) in the processing circuit 101, and the contents of the programs as shown in FIG. 8. The updated time data indicates, e.g., 15:00, May 1, 1997 with respect to the program A1 in FIG. 8. If a program having the same name as that of the program stored in the storage unit 103 of the server processing unit 100 exists in a temporary storage region 502 of the storage unit 203 of the client processing unit 200, the general-purpose browsing program 701 operating on the client processing unit 200 compares the updated time data of the program stored in the storage unit 203 of the client processing unit 200 with that of the same name program stored in the storage unit 103 of the server processing unit 100. If the program stored in the storage unit 203 of the client processing unit 200 is older, the current program is read out of the server processing unit 100 to the memory 202 of the client processing unit 200 to be executed, and stored in the temporary storage region 502 of the storage unit 203.

FIG. 9 shows the contents which are stored in the memory 102 of the server processing unit 100 during execution and which are transmitted from the above described programs 401 and 402.

FIG. 10 shows the contents stored in the storage unit 203 of the client processing unit 200. In this storage unit 203, the general-purpose browsing program 501 is stored, and the temporary storage region 502 is set.

FIG. 11 shows the contents stored in the memory 202 of the client processing unit 200 during execution. In this memory 202, the general-purpose browsing program 501 is read out of the storage unit 203 to be stored as shown by reference number 701. Moreover, as described above, the updated times of the programs 403 through 405 stored in the storage unit 103 of the server processing unit 100 are compared, and only the required programs are transmitted to be stored as shown by reference numbers 702 through 704.

Figure 12:
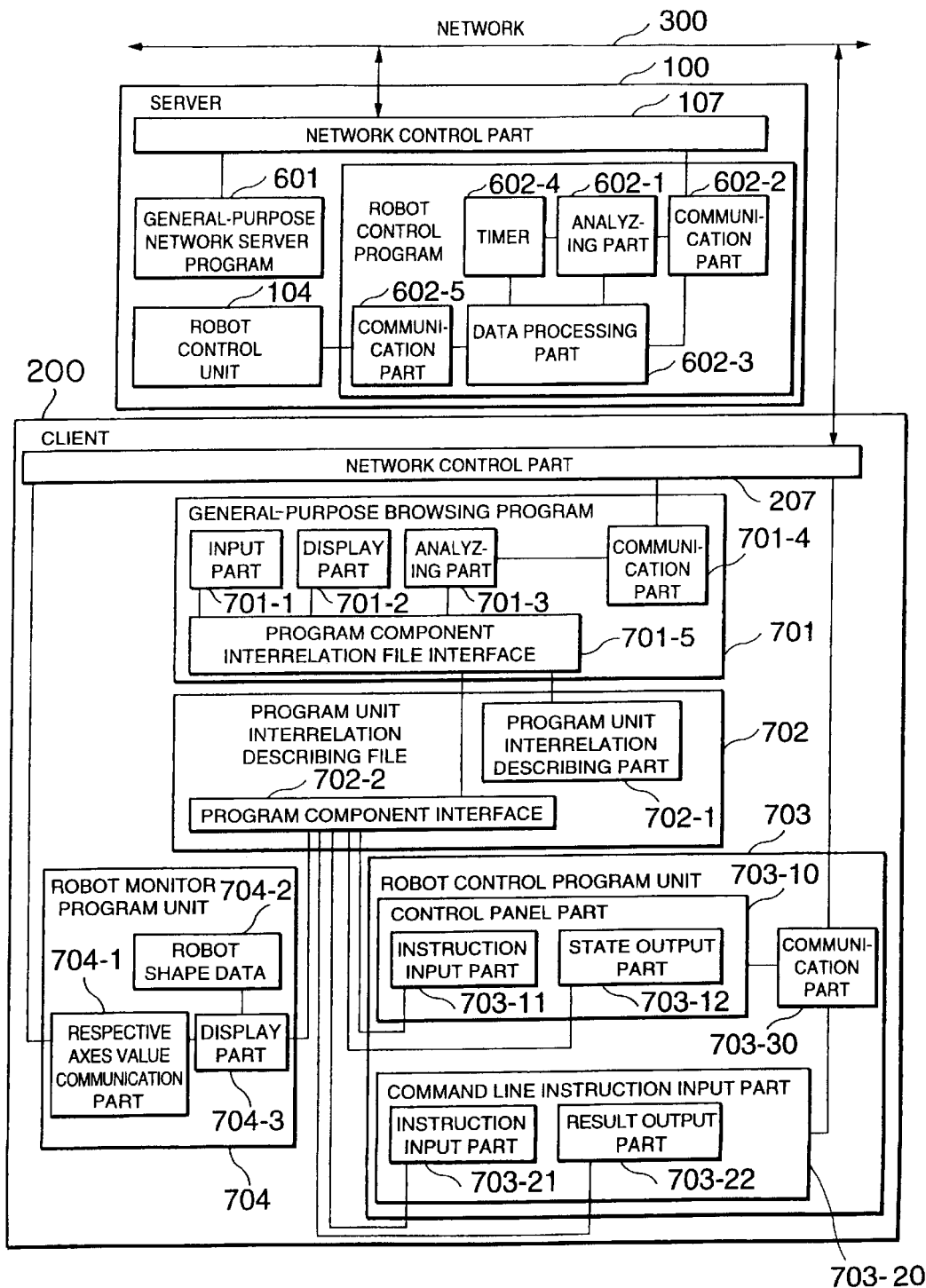
FIG. 12 is a block diagram for explaining the operations of programs in the server processing unit and the client processing unit.
Figure 13:
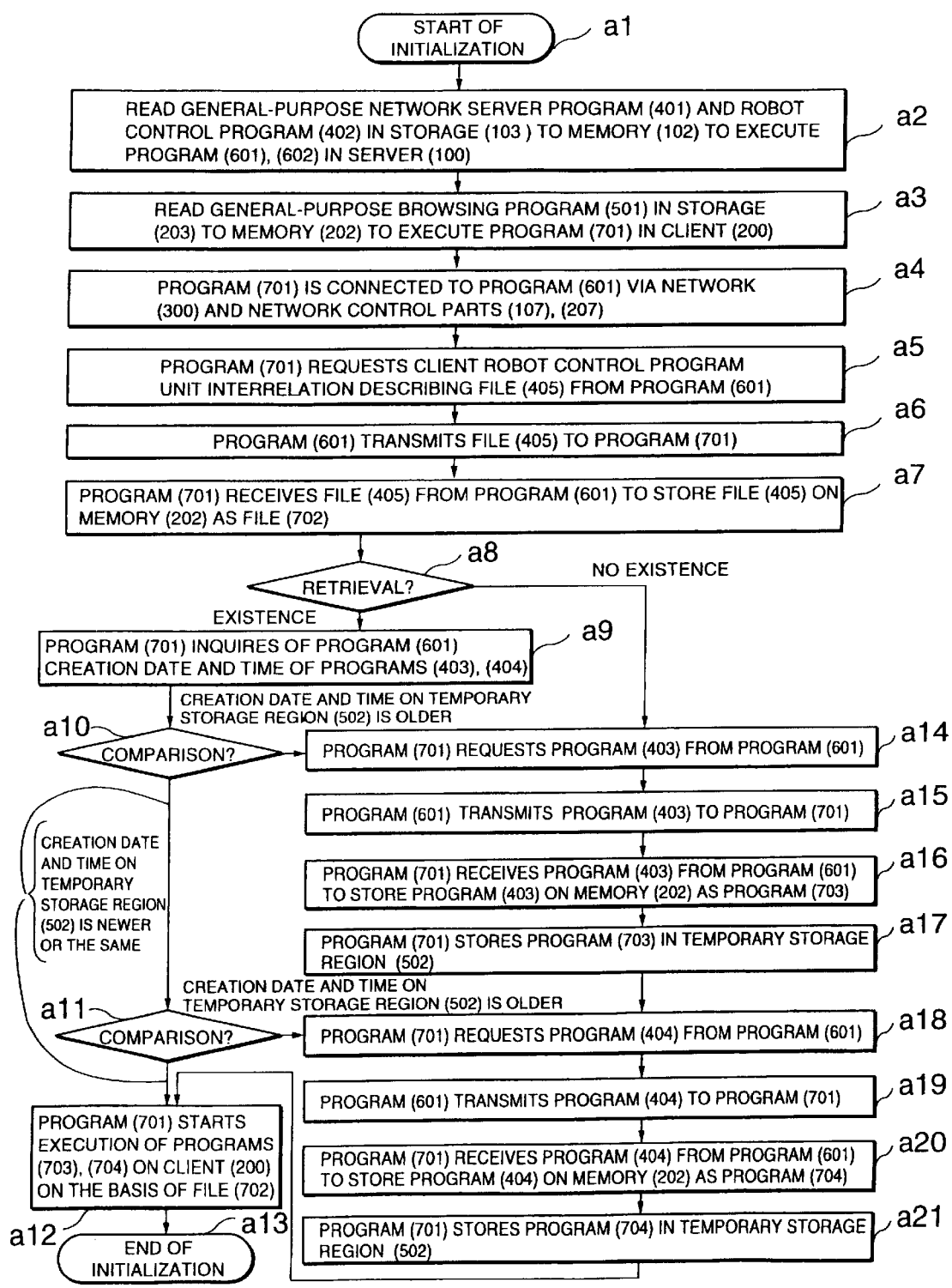
FIG. 13 is a flow chart for explaining the flow of processing until a program is executed on the client processing unit after the start of the server processing unit.
Figure 14:
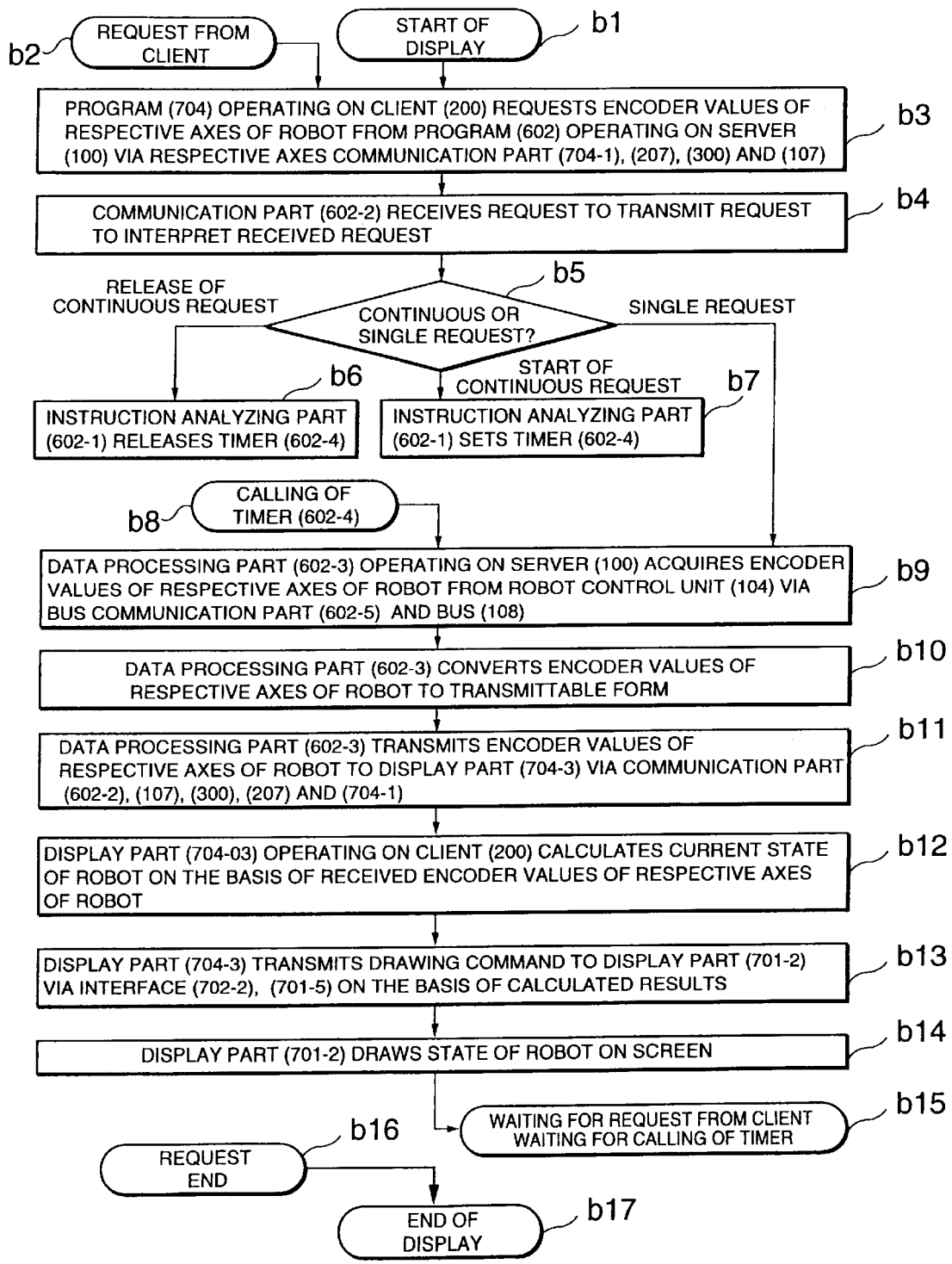
FIG. 14 is a flow chart for explaining the operation of a robot monitor program.
Figure 15:
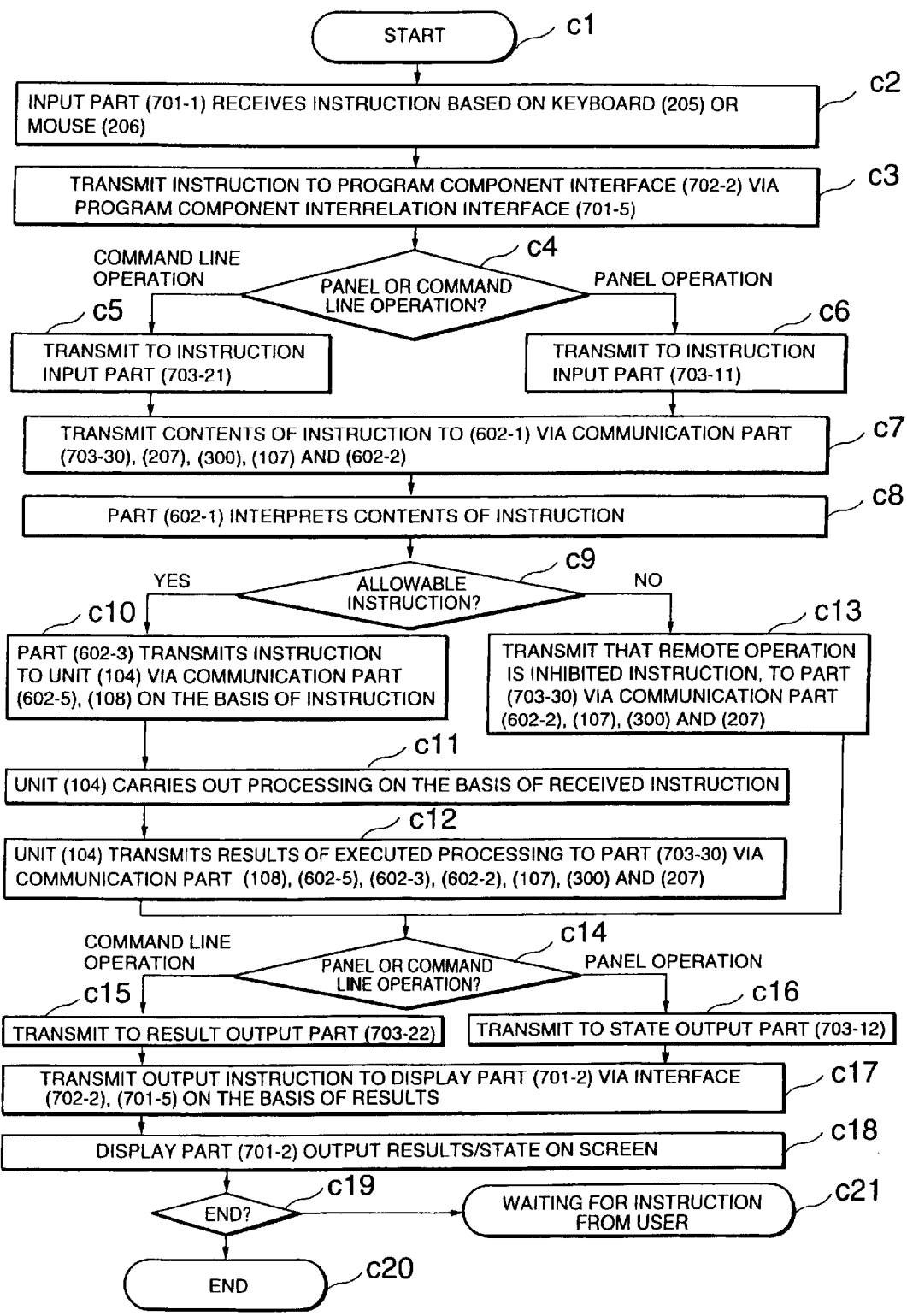
FIG. 15 is a flow chart for explaining the operation of a robot control program.

FIG. 12 is a block diagram for explaining the operations of the programs in the server processing unit 100 and the client processing unit 200. Referring to the above described FIGS. 2 through 12 and FIGS. 13 through 15, the operations of the programs in the server processing unit 100 and the client processing unit 200 will be described below. FIG. 13 is a flow chart for explaining the flow of processing until a program is executed on the client processing unit 200 after the start of the server processing unit 100, and FIG. 14 is a flow chart for explaining the operation of a robot monitor program. In addition, FIG. 15 is a flow chart for explaining the operation of a robot control program.

When the server processing unit 100 is started, the general-purpose network server program and the server robot control program are transmitted from the storage unit 103 to the memory 102 to be developed to be executed. The contents of the memory 102 during execution are shown in FIG. 9 which has been described above.

In FIG. 12, the robot control unit 104 is connected to a standard bus of the server processing unit 100 (see FIG. 2), and transmits command data to the servo unit 105 by command data, which are transmitted from the server robot control program 602 executed on the server processing unit 100, to drive and control the respective axes of the robot body 106. The robot control unit 104 is connected to the servo unit 105 by means of a high speed serial communication protocol.

In the client processing unit 200, the general-purpose browsing program 501 is read out of the storage unit 203 to the memory 202 to be developed to be started as the general-purpose browsing program 701. If the general-purpose browsing program 701 is connected to the general-purpose network server program 601 operating on the server processing unit 100, the general-purpose browsing program 701 transmits the client robot control program unit interrelation describing file 405, which is read out of the storage unit 103, via the network 300 to store the file 405 on the memory 202 (see reference number 702 in FIG. 11). The general-purpose browsing program 701 analyzes the contents of the client robot control program unit interrelation describing file 702, and retrieves the necessary client robot control program unit and client robot monitor program unit from the temporary storage region 502. At this time, when the necessary programs are not found, the necessary programs are transmitted from the server processing unit 100 via the network 300 to be copied. On the other hand, when the necessary programs are found, the found programs are compared with those in the server processing unit 100, and only the older programs of the client processing unit 200 are transmitted from the server processing unit 100 via the network 300 to be copied to be developed on the memory 202 to be executed. The contents stored in the memory 202 during execution are shown in FIG. 11 which has been described above. Referring to FIG. 13, the flow of processing until the program is executed on the client processing unit 200 after the start of the server processing unit 100 will be described below. In addition, referring to FIG. 14, the operation of the robot monitor program will be described below. Moreover, referring to FIG. 15, the operation of the robot control program will be described below.

First, referring to FIG. 13, the flow of processing (initialization processing) until the program is executed on the client processing unit 200 after the start of the server processing unit 100 will be described. Furthermore, the server processing unit will be hereinafter referred to as just a "server", and the client processing unit will be hereinafter referred to as just a "client". The routine goes from step a1 to step a2 wherein the general-purpose network server program 401 and server robot control program 402 stored in the storage unit 103 of the server 100 as shown in FIG. 7 are read to the memory 102 to start the programs 601 and 602 stored as shown in FIG. 9. At step a3, the general-purpose browsing program 501 stored in the storage unit 203 of the client 200 as shown in FIG. 10 is read to the memory 202 to start the program 701 stored as shown in FIG. 11. At step a4, the started general-purpose browsing program 701 is connected to the general-purpose network server program 601 via the network control part 207, network 300 and network control part 107.

At step a5, the general-purpose browsing program 701 requests the client robot control program unit interrelation describing file 405 (see FIG. 7) stored in the storage unit 103. At step a6, the general-purpose network server program 601 transmits the client robot control program unit interrelation describing file 405 to the general-purpose browsing program 701.

At step a7, the general-purpose browsing program 701 receives the client robot control program unit interrelation describing file 405 from the general-purpose network server program 601, and stores the client robot control program unit interrelation describing file 702 on the memory 202 as shown in FIG. 11.

At step a8, the analyzing part 701-3 of the general-purpose browsing program 701 of the client 200 analyzes the output of the input part 701-1, and retrieves the client robot control program unit 403 and client robot monitor program unit 404, which are necessary to be used for the client robot control program unit interrelation describing file 702, from the temporary storage region 502. After the retrieval at step a8, if the program units 403 and 404 exist, the routine goes to the next step a9 wherein the general-purpose browsing program 701 inquires of the general-purpose network server program 601 the creation date and time of the client robot control program unit 403 and client robot monitor program unit 404. At step a1, the creation date and time of the client robot control program unit 403 in the storage unit 103 are compared with the creation date and time of the corresponding program existing in the temporary storage region 502 of the storage unit 203. If the creation date and time of the program stored on the temporary storage region 502 are newer than or the same as those of the unit 403, the routine goes to the next step a11. At step a11, the creation date and time of the client robot monitor program unit 404 are compared with the creation date and time of the corresponding program existing on the temporary storage region 502. If the creation date and time of the program stored on the temporary storage region 502 are newer than or the same as those of the unit 404, the routine goes to the next step a12 wherein the general purpose public program 701 starts to execute the client robot control program unit 703 and client robot monitor program unit 704 on the client 200 on the basis of the client robot control program unit interrelation describing file 702, and the initialization processing ends at step a13.

On the other hand, at the above described step a10, if the creation date and time of the corresponding program stored on the temporary storage region 502 are older than the creation date of the client robot control program unit 403, the routine goes to step a14 wherein the general-purpose browsing program 701 requests the client robot control program unit 403 from the general-purpose network server program 601. Thus, at step a15, the general-purpose network server program 601 transmits the client robot control program unit 403 to the general-purpose browsing program 701. Thus, at step a16, the general-purpose browsing program 701 receives the client robot control program unit 403 from the general-purpose network server program 601, and stores the received unit 403 on the memory 202 as the client robot control program unit 703. At step a17, the general-purpose browsing program 701 stores the client robot control program unit 703 on the temporary storage region 502. Furthermore, with respect to the creation date and time of the client robot monitor program unit 404 and programs of the temporary storage region 502 corresponding thereto, steps a18 through a21 are executed similar to the above described steps a14 through a17, and the routine goes to step a12.

Referring to FIG. 14, the operation of the robot monitor program will be described below. At the request of the keyboard 205 and/or the mouse 206 of the client 200 at steps b1 and b2, at step b3, the client robot monitor program unit 704 of the memory 202 shown in FIG. 11, which operates on the client 200, requests an output value, which is outputted from an encoder (detecting means) for detecting the positions of the respective axes of the robot body 106, from the server robot control program 602 of the memory 102 shown in FIG. 9, which operates on the server 100, via the respective axes value communication part 704-1, the network control part 207, the network 300 and the network control part 107. Thus, at step b4, the bus communication part 602-2 receives the request and transmits the received request to an instruction analyzing part 602-1 to interpret the received request.

At step b5, it is determined whether the request is a continuous request or a single request. If it is determined at step b5 that the request is the release of the continuous request, the instruction analyzing part 602-1 releases the operation of a timer 602-4 at step b6. If it is determined that the request is the start of the continuous request, the instruction analyzing part 602-1 sets the timer 602-4 to start a clock operation at step b7. Thus, at step b8, the timer 602-4 carries out calling operations at predetermined time intervals, and the routine goes to the next step b9. On the other hand, if it is determined at step b5 that the request is the single request, the routine goes to step b9. The single request means a request for a single data, and the continuous request means a request for a plurality of data.

The client robot control program units 403 and 703 include commands for the fixed location/repeat, hold/run and cycle start of the robot body 106, and the on/off, error reset and emergency stop of the motor power supply. These commands can be inputted by operating the keyboard 205 and/or the mouse 206. When the mouse 206 is used, the display state of the display unit 204 is like the above described input display region 204c in FIG. 3, and the above described commands are inputted in accordance with the switch of the display states shown in FIGS. 5 and 6.

At step b9, the data processing part 602-3 operating on the server 100 acquires the output values of an encoder, which are indicative of the positions of the respective axes of the robot body 106, from the robot control unit 104 via the bus communication part 602-5 and the bus 108. At step b10, the data processing part 602-3 of the server 100 converts the output values of the encoder of the respective axes of the robot body 106 into a transmittable form. At the next step b11, the data processing part 602-3 transmits the output values of the encoder of the respective axes of the robot body 106 to the display part 704-3 via the bus communication part 602-2, the network control part 107, the network 300, the network control part 207 of the client 200 and the respective axes values communication part 704-1 of the client robot monitor program unit 704. At step b12, the display part 704-3 operating on the client 200 calculates the current state of the robot body 106 on the basis of the received output values of the encoder of the respective axes of the robot body 106.

At step b13, on the basis of the calculated results, the display part 704-3 gives a drawing command to the display part 701-2 via the program component interface 702-2 of the client robot control program unit interrelation describing file 702 and the program component interrelation file interface 701-5 of the general-purpose browsing program 701. Thus, at step b14, the display part 701-2 draws the state of the robot body 106 on the screen of the display unit 204 in the form of, e.g., a perspective view or a table. Thus, at the next step b15, the waiting state for the request from the client 200 or the waiting state for the calling of the timer 602-4 is provided. Furthermore, if the client 200 makes a request for end at step b16, the display of the display unit 204 ends at step b17.

Therefore, in the preferred embodiment of the present invention, the client robot monitor program unit 404 is first transmitted via the network 300, and thereafter, the output values of the encoder are only transmitted via the network. Therefore, the image data for displaying the image indicative of the operating state of the robot body 106 is not transmitted via the network 300, so that the amount of information for transmitting the network 300 can be reduced, and the operation of the robot body 106 can be displayed on the display unit 204 without causing a time lag.

Referring to FIG. 15, the operation of the robot control program for operating the robot body 106 by the client 200 will be described below. The routine goes from step c1 to step c2 wherein command data are inputted by operating the keyboard 205 or mouse 206 of the client 200, and the command data are received by the input part 701-1 of the general-purpose browsing program 701. At step c3, the command data are transmitted to the program component interface 702-2 via the program component interrelation file interface 701-5 of the general-purpose browsing program 701. At step c4, it is determined whether a panel operation, i.e., the input operation using the mouse 206, or a command line operation, i.e., the input operation using the keyboard 205, has been carried out. If the panel operation using the mouse 206 has been carried out, the inputted command data are transmitted to the instruction input part 703-11 of the client robot control program unit 703 at step c6. If the command line operation using the keyboard 205 has been carried out, the inputted command data are transmitted to the instruction input part 703-21 at step c5.

At step c7, the contents of instruction are transmitted to and received by the instruction analyzing part 602-1 from the communication part 703-30 of the client robot control program unit 703 via the network control part 207, the network 300, the network control part 107 of the server 100 and the bus communication part 602-2 of the server robot control program 602. At step c8, the instruction analyzing part 602-1 interprets the contents of instruction, and at step c9, it is determined whether the command data remote-controlled by the client 200 are allowable instructions. If the command data are allowable instructions, the routine goes to step c10. At step c10, the data processing part 602-3 transmits an instruction corresponding to the command data to the robot control unit 104 via the bus communication part 602-5 and the bus 108 on the basis of the command data. On the other hand, when the command data from the client 200 are not allowable instructions, the routine goes from step c9 to step c13 wherein the fact that the command data remote-controlled by the client 200 are inhibited instruction is transmitted to the communication part 703-30 of the client robot control program unit 703 from the instruction analyzing part 602-1 via the bus communication part 602-2, the network control part 107, the network 300 and the network control part 207 of the client 200. The command data wherein the input by the operation of the keyboard 205 or the mouse 206 in the client 200 is inhibited is, e.g., a command for displacing the respective axes of the robot body 106 by a predetermined unit displacement amount, i.e., by one step.

At step c14, it is determined whether the panel operation using the mouse 206 in the client 200 or the command line operation using the keyboard 205 has been carried out. If the command line operation using the keyboard 205 has been carried out, the routine goes to step c15 wherein it is transmitted to the result output part 703-22 of the command line instruction input part 703-20 of the client robot control program unit 703. On the other hand, if the panel operation using the mouse 206 has been carried out, the routine goes to step c16 wherein it is transmitted to the state output part 703-12 of the control panel part 703-10. Thus, at step c17, the output instruction is transmitted on the basis of the results to the display part 701-2 via the program component interface 702-2 of the client robot control program unit interrelation file 702 and the program component interrelation file interface 701-5 of the general-purpose browsing program 701. At step c18, the display part 701-2 outputs and displays the above described result and state on the screen of the display unit 204.

If it is determined at step c19 that the execution of the robot control program ends, the execution of the robot control program ends at step c20, and if it is determined that it does not end, the instruction waiting state for the command data based on the input operation using the keyboard 205 or the mouse 206 by the user is provided at step c21. Therefore, if the command data are inputted by the keyboard 205 or the mouse 206 to derive and control the robot body 106, the operating state of the robot body 106 can be displayed on the display unit 204 by the result output part 703-2 or the state output part 703-12 to be confirmed.

Furthermore, while FIGS. 13 through 15 have mainly described the operations of the programs, these programs are executed by the processing circuit 101 of the server 100 and the processing circuit 201 of the client 200.

As described above, according to the present invention, only the detection data indicative of the positions of the respective axes of the robot body detected by the detecting means in the server processing unit are given to the processing means of the client processing unit via the communication line, so that the image of the whole robot body combining the positions of the respective axes, such as a perspective view of the robot body, is displayed on the display means. As described above, only the detection data may be transmitted to the communication line, and it is not required to transmit the picture signals of the whole image displayed by the display means, so that it is possible to reduce the amount of information to be transmitted.

In addition, according to the present invention, the detection data and the monitor program are transmitted from the server processing unit to the client processing unit via the communication line, so that the unified management of application programs can be carried out on the server processing unit side. Therefore, the application programs can be easily changed. In addition, there are excellent advantages in that the first and second communication means connected via the communication line can directly utilize, e.g., general-purpose network apparatus or materials, and directly utilize a general-purpose development tool for the development of an application program, such as a monitor program.

In addition, according to the present invention, by transmitting the robot control program from the server processing unit to the client processing unit via the communication line to prepare command data for driving and controlling the respective axes of the robot body by means of the input means of the client processing unit, the respective axes of the robot body can be driven and controlled on the client processing unit side. In addition, by using the above described monitor program, the client processing unit can cause the input means to prepare command data to drive and control the robot body while visually observing the operating state of the robot body by the display means.

Moreover, according to the present invention, the updated times of programs, such as a monitor program and a robot control program, which were changed by the server processing unit, e.g., the past updated time data indicative of date and time, at which the programs were modified and updated, can be stored in the server storage means so as to correspond to the respective programs. In the client processing unit, when the program is to be executed, if the updated time represented by the updated time data of the program stored in the client storage means of the client processing unit is older than the updated time represented by the updated time data of the corresponding program stored in the server storage means, the program, together with the updated time data, stored in the server storage means can be received by the client processing unit via the communication line to execute the current program. Furthermore, when the updated time of the server storage means is the same as the updated time data of the client storage means, it is not required to transmit the program together with the updated time data. Also, when the updated time represented by the updated time data stored in the server storage means is older than the updated time represented by the updated time data stored in the client storage means, the program is not transmitted together with the updated time data.

Moreover, according to the present invention, it is possible to easily change a program on the basis of an individual specification by changing an interrelation describing file.

Thus, according to the present invention, a robot controller software can be supplied as a network corresponding software component, and a network corresponding robot controller application program can be developed using the software component, so that there are innovative advantages in that it is possible to develop an application program of a user's individual specification and it is possible to develop an application program capable of operating on a network.

What is claimed is:

1. A robot information processing apparatus comprising:
   a server processing unit including detecting means for detecting the positions of a plurality of axes of a robot body, which serves as an object to be driven, and for outputting detection data, and first communication means for transmitting said detection data outputted from said detecting means; and
   a client processing unit connected to said server processing unit via a communication line, said client processing unit including display means for carrying out a visual display, second communication means for communicating with said first communication means via said communication line, and processing means for displaying said detection data, which are received by said second communication means, on said display means.

2. A robot information processing apparatus comprising:
   a server processing unit including detecting means for detecting the positions of a plurality of axes of a robot body, which serves as an object to be driven, and for outputting detection data, server storage means for storing a monitor program for displaying said detection data, and first communication means for transmitting said detection data, which are outputted from said detecting means, and said monitor program stored in said server storage means; and
   a client processing unit connected to said server processing unit via a communication line, said client processing unit including display means for carrying out a visual display, second communication means for communicating with said first communication means via said communication line, and processing means for executing said monitor program, which is received by said second communication means, to display said detection data on said display means.

3. The robot information processing apparatus as set forth in claim 2, wherein said server processing unit further comprises: program updating means for updating said monitor program stored in said server storage means; and updated time data generating means for generating updated time data indicative of an updated time of said monitor program updated by said program updating means and for storing said updated time data, together with the updated monitor program, in said server storage means,
   wherein said client processing unit further comprises client storage means for storing a monitor program and updated time data, and
   wherein said processing means of said client processing unit reads out updated time data, which correspond to a monitor program to be executed, from said server storage means via said second communication means, and reads out updated time data stored in said client storage means, so that a processing means of said client processing unit reads out a monitor program, which is stored in said server storage means, from said server storage means via said second communication means, when said updated time data stored in said client storage means are older than said updated time data from said server storage means.

4. The robot information processing apparatus as set forth in claim 2, wherein said server storage means stores an interrelation describing file for defining the interrelation between program units, which are executed by said server processing unit and client processing unit, so as to be able to modify said interrelation describing file, and
   wherein said server processing unit and said client processing unit select and execute a program unit designated by said interrelation describing file.

5. The robot information processing apparatus as set forth in claim 4, wherein said program unit executed in said client processing unit operates on a general-purpose browsing program.

6. A robot information processing apparatus comprising:
   a server processing unit including control means for driving and controlling a robot body having a plurality of axes, which is an object to be driven, in response to command data at real time, server storage means for storing a robot control program for operating said robot body, and first communication means for transmitting said robot control program, which is stored in said server storage means, and for providing command data to said control means; and
   a client processing unit connected to said server processing unit via a communication line, said client processing unit including second communication means for communicating with said first communication means via said communication line, input means for inputting command data, and processing means for executing said robot control program, which is received by said second communication means, to transmit command data, which are inputted by said input means, to said first communication means by said second communication means.

7. The robot information processing apparatus as set forth in claim 6, wherein said server processing unit further comprises: program updating means for updating said robot control program stored in said server storage means; and updated time data generating means for generating updated time data indicative of an updated time of said robot control program updated by said program updating means and for storing said updated time data, together with the updated robot control program, in said server storage means, wherein said client processing unit further comprises client storage means for storing a robot control program and said updated time data, and wherein said processing means of said client processing unit reads out updated time data, which correspond to a robot control program to be executed, from said server storage means via said second communication means, and reads out updated time data stored in said client storage means, so that said processing means of said client processing unit reads out said robot control program, which is stored in said server storage means, from said server storage means via said second communication means, when said updated time data stored in said client storage means are older than said updated time data from said server storage means.

8. The robot information processing apparatus as set forth in claim 6, wherein said server storage means stores an interrelation describing file for defining the interrelation between program units, which are executed by said server processing unit and client processing unit, so as to be able to modify said interrelation describing file, and wherein said server processing unit and said client processing unit select and execute a program unit designated by said interrelation describing file.

9. The robot information processing apparatus as set forth in claim 7, wherein said program unit executed in said client processing unit operates on a general-purpose browsing program.

* * * * *

UNITED STATES PATENT AND TRADEMARK OFFICE
CERTIFICATE OF CORRECTION

PATENT NO. : 6,175,206 B1  Page 1 of 1
DATED : January 16, 2001
INVENTOR(S) : Takahiro Ueno, et al It is certified that error appears in the above-identified patent and that said Letters Patent is hereby corrected as shown below:

Title page:
Item [54] should read: ----- ROBOT INFORMATION PROCESSING APPARATUS -----.

Signed and Sealed this

Nineteenth Day of June, 2001

*Attest:*

*Attesting Officer*

NICHOLAS P. GODICI
*Acting Director of the United States Patent and Trademark Office*